Figure 1:
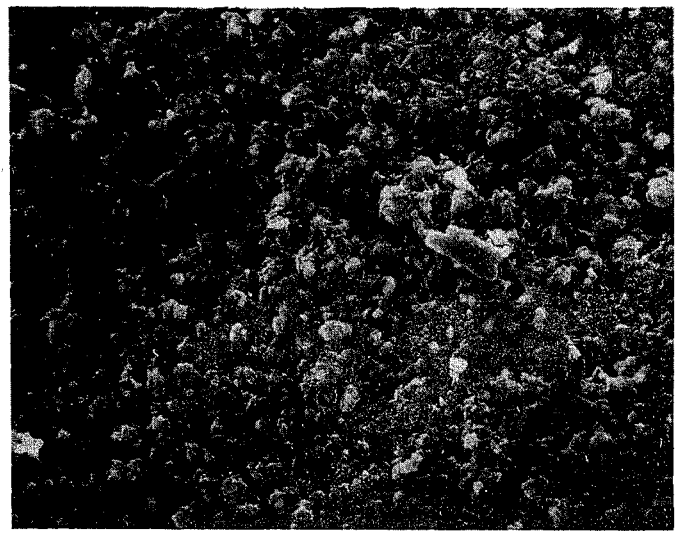

United States Patent [19]

Singh

[11] 4,374,701
[45] Feb. 22, 1983

[54] CHEMICALLY POLISHED CERAMIC BODY

[75] Inventor: Raj N. Singh, Schenectady, N.Y.

[73] Assignee: General Electric Company, Schenectady, N.Y.

[21] Appl. No.: 289,578

[22] Filed: Aug. 3, 1981

[51] Int. Cl.³ .................... B44C 1/22; C03C 15/00; C03C 25/06
[52] U.S. Cl. .................... 156/667; 156/636; 156/663; 156/903; 252/79.2; 429/193
[58] Field of Search ............... 156/636, 667, 903, 663, 156/665; 252/79.2; 429/193

[56] References Cited

U.S. PATENT DOCUMENTS 3,964,942  6/1976  Berkenblit et al. ............ 156/667 X
4,141,781  2/1979  Greskovich et al. ........... 156/667 X

FOREIGN PATENT DOCUMENTS 49-40843  11/1974  Japan ................................. 156/667

OTHER PUBLICATIONS

Mat. Res. Bull., vol. 5, pp. 167-171, No. 3, Pergamon Press, Inc., Printed in the U.S., the Chemical Polishing of Magnesium Aluminate Spinel in Pyrophosphoric Acid, R. Aeschlimann et al., Jan. 7, 1970.

Primary Examiner—William A. Powell
Attorney, Agent, or Firm—Jane M. Binkowski; James C. Davis, Jr.; James Magee, Jr.

[57] ABSTRACT

An alkali metal beta- and/or beta"-alumina polycrystalline body is chemically polished by contacting it at a polishing temperature with phosphoric acid of polishing concentration.

12 Claims, 3 Drawing Figures

CHEMICALLY POLISHED CERAMIC BODY

The present invention relates to the chemical polishing of a polycrystalline ceramic of alkali metal beta- and/or alkali metal beta"-alumina composition. In one particular aspect, it relates to the chemical polishing of the ceramic body to significantly improve its electrical and/or mechanical properties. In another particular aspect, it relates to a polished cationically-conductive ceramic body useful as an electrolyte in a sodium-sulfur cell.

A sodium-sulfur battery utilizes a ceramic separator material based on either sodium beta- and/or sodium beta"-alumina phases. The ceramic separator also performs as an electrolyte which preferentially allows only sodium ion migration during the operation of the battery. Specifically, the sodium-sulfur battery operates at about 330° C., and both sodium and sulfur are molten at the battery operating temperature. The separator between the sodium and the sulfur electrode is a solid ionic membrane, usually just called beta-alumina (a chemical compound of $Na_2O$ and $Al_2O_3$, often with dopants such as $Li_2O$ and/or MgO). This solid ceramic membrane allows only $Na^+$-ion transport.

As in any other battery, the basic building block is a cell. Presently, the sodium-sulfur cell is cylindrical in geometry, and employs a closed-end sodium beta-alumina ceramic tube. In most designs, the inside of the tube is filled with sodium. Since sulfur is a poor conductor of electricity, a porous carbon matrix is used as the current collector. The beta-alumina ceramic tube is sealed onto a donut-shaped ceramic insulating disc to create a complete physical-chemical separation between the sodium and sulfur electrodes. The sodium and the sulfur containers serve as current collectors. In a battery, many sodium-sulfur cells are connected electrically in series/parallel.

Although these ceramic sodium beta- and/or beta"-alumina electrolytes have exhibited good or superior cell life, they also have suffered from higher resistivity values and resistance aging (increase in the electrolyte resistivity with usage in the Na/S cell). An investigation of this phenomenon shows that the cell resistance in the radial direction of the ceramic electrolyte tube is invariably higher than the value estimated from intrinsic (bulk) resistivity data for that material. This suggests that there may be a surface film of higher resistivity value which produces higher in-cell resistivity values (in the radial direction) for these ceramic compositions. For example, a resistive surface film might be formed because of excessive amount of soda ($Na_2O$) in the material, i.e. an amount beyond the solubility limit for the beta- and/or beta"-alumina phase, and therefore will result in the precipitation of excess soda on the surface and grain boundaries of the sintered material. Since the soda-rich phases are more resistive than the phase-pure sodium beta- and/or sodium beta"-alumina ceramic material, they will cause the ceramic electrolyte to show additional resistivity in a Na/S cell due to the resistive surface film. Therefore, it is hypothesized that the removal of this surface film should result in lower Na/S resistance. This further suggests that in the absence of such a resistive film on the surfaces of the ceramic electrolyte, the phenomenon of resistance aging could also be minimized or eliminated.

In one aspect, the present invention is directed to the removal of surface film from the ceramic body by chemical polishing producing a ceramic body with a polished surface having a significantly uniform specific resistivity throughout the body, i.e. the specific resistivity at its surface portion is the same as or does not differ significantly from its specific intrinsic resistivity.

A sodium-sulfur battery utilizing sodium beta"-alumina electrolyte offers advantages of superior energy efficiency than a battery system that utilizes sodium beta-alumina electrolyte. A number of electrolytes of sodium beta"-alumina phase composition, or a mixture of sodium beta- and beta"-alumina phase composition wherein the beta"-alumina phase was present in a predominant amount, have been fabricated so far; however, most in as-sintered state have shown deleterious effects of asymmetric polarization and resistivity aging, i.e. increase in the electrolyte resistivity with usage in the Na/S battery system. It was experimentally found that these ceramic electrolytes processed in a normal manner show the presence of soda-rich phases as well as glassy metastable phase. In addition, impurity phases have also been found. It was suspected that the presence of these phases cause ceramics to be more sensitive to the atmospheric contaminants like moisture and $CO_2$ causing the ceramic to polarize in an asymmetric manner.

In another aspect, the present invention is directed to removing asymmetric polarization-causing phases or material from the electrolyte surfaces to produce a polished ceramic electrolyte of symmetric polarization. In contrast, electrolytes of sodium beta-alumina phase composition do not show asymmetric polarization.

In still another aspect, the present invention is directed to improving the life of a ceramic body of alkali metal beta- and/or beta"-alumina phase by chemically polishing away micro-cracks and other flaws which would be deleterious to strength or electrical properties producing a ceramic body with a polished surface.

Figure 2:
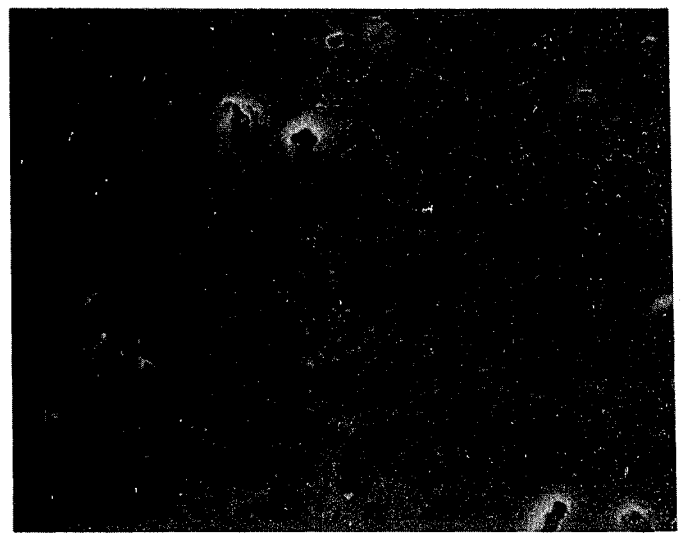
Figure 3:
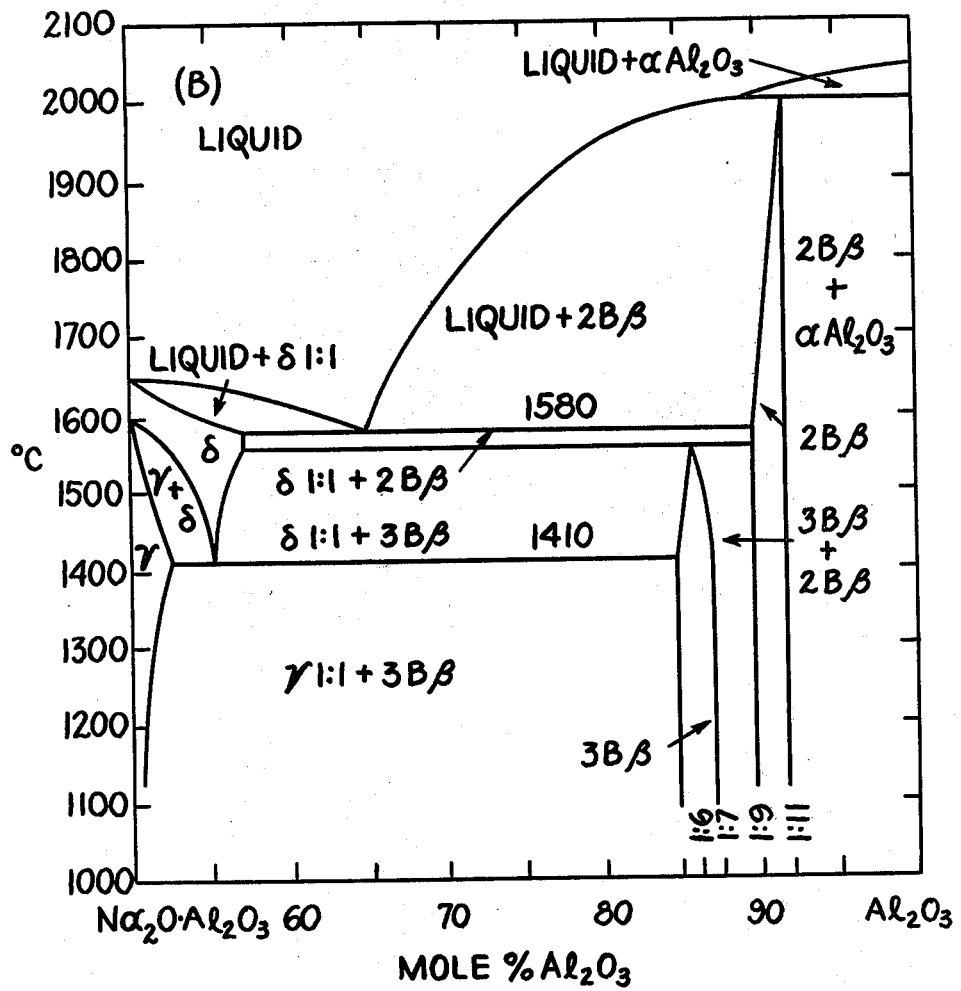

Those skilled in the art will gain a further and better understanding of the present invention from the detailed description set forth below, considered in conjunction with the figures accompanying and forming a part of the specification, in which:

FIG. 1 is a scanning electron micrograph (magnified 1000X) of an as-sintered sodium beta-alumina polycrystalline ceramic body;

FIG. 2 is a scanning electron micrograph (magnified 1000X) of the ceramic body of FIG. 1 after it was polished according to the present invention; and FIG. 3 is a phase diagram of the system $Na_2O.Al_2O_3$ which is shown on page 367 of "Evaluation of the Literature Data on $\beta$-$Al_2O_3$ and Related Phases," R. C. DeVries and W. L. Roth, Journal of American Ceramic Society, Vol. 52, No. 7, pages 364–369) wherein 2B $\beta$ denotes sodium beta-alumina phase and 3B $\beta$ denotes sodium beta"-alumina phase.

Briefly stated, in a first embodiment, the present method comprises providing a non-polished polycrystalline ceramic body, said ceramic body ranging in composition from an alkali metal beta-alumina phase to an alkali metal beta"-alumina phase including all combinations of said alkali metal beta-alumina phase and said alkali metal beta"-alumina phase, said alkali metal being selected from the group consisting of sodium, potassium, lithium, mixtures thereof, and alloys thereof, and polishing said ceramic body by contacting it with phosphoric acid to produce a ceramic body with a polished surface, said phosphoric acid having a concentration of $P_2O_5$ which polishes said ceramic body, said polishing having no significant deleterious effect on said ceramic body.

A non-polished ceramic body is one with a non-polished surface such as, for example, an as-sintered body, i.e. one which has the same or substantially the same surface characteristics it had upon completion of sintering, or a machined sintered body, or a ceramic body with a rough or flawed surface. Specifically, the present invention is useful for any polycrystalline ceramic body of the present composition which requires that its surface or surface portion be chemically polished.

The present acid-polished ceramic body has a smooth glossy finish.

Briefly stated, in a second embodiment, the present process comprises producing a cationically-conductive ceramic body having a polished surface and a specific resistivity at its polished surface portion which is at least not significantly different from its specific intrinsic resistivity which comprises providing a cationically-conductive ceramic body having a specific resistivity at its surface portion significantly higher than its specific intrinsic (bulk) resistivity, said ceramic body ranging in composition from an alkali metal beta-alumina phase to an alkali metal beta''-alumina phase including all combinations of said alkali metal beta-alumina phase and said alkali metal beta''-alumina phase, said alkali metal being selected from the group consisting of sodium, potassium, lithium, mixtures thereof and alloys thereof, and polishing said ceramic body by contacting it with phosphoric acid to produce said cationically-conductive body with a polished surface, said phosphoric acid having a concentration of $P_2O_5$ which polishes said ceramic body, said polishing having no significant deleterious effect on said ceramic body.

Specific resistivity is a property of the material itself and resistance depends on the size of the sample as shown by the following formula $$R = \rho(L/A)$$

where R is the resistance in ohms of the ceramic body, L is its length, A is its cross-sectional area and $\rho$ is its specific resistivity (ohm-cm).

As used herein specific resistivity is the resistance in ohms of the ceramic body one centimeter long and one square centimeter in cross-section. The smaller the intrinsic resistivity of the ceramic body, the better it is as a conductor.

A number of techniques can be used to determine the specific intrinsic resistivity of the ceramic body such as, for example, the four probe technique and complex impedance analysis. The four probe technique is comprised of four electric terminals inserted within the sample. Two of the terminals are used for passing current within the sample only, and the other two terminals are used for measuring the generated potential difference. In this technique, since the current passes only within the sample, the potential difference generated is that of the bulk of the sample, or predominantly that of the bulk of the sample, and not that of the surface. Knowing the potential difference and the current for the sample, its resistance can be determined, i.e. resistance = potential difference/current, and from the resistance and size of the sample, its specific resistivity can be determined.

Complex impedance analysis is a standard method in the art which measures resistance as a function of frequency over a wide range of frequencies, and from these plots, the specific bulk or intrinsic resistivity can be determined.

The product of the second embodiment is a cationically-conductive ceramic body having a polished surface, said ceramic body having a specific resistivity at its polished surface portion which is at least not significantly different from its specific intrinsic resistivity, said ceramic body ranging in composition from an alkali metal beta-alumina phase to an alkali metal beta''-alumina phase including all combinations of said alkali metal beta-alumina phase and said alkali metal beta''-alumina phase, said alkali metal being selected from the group consisting of sodium, potassium, lithium, mixtures thereof and alloys thereof.

Briefly stated, in a third embodiment, the present process comprises producing a cationically-conductive ceramic electrolyte of symmetric polarization which comprises providing a cationically-conductive ceramic electrolyte of asymmetric polarization, said electrolyte ranging in composition from an alkali metal beta''-alumina phase to a mixture of alkali metal beta''-alumina phase and up to about 50% by volume of alkali metal beta-alumina phase based on the total volume of the electrolyte, said alkali metal being selected from the group consisting of sodium, potassium, lithium, mixtures thereof and alloys thereof, and polishing said ceramic electrolyte by contacting it with phosphoric acid to produce said cationically-conductive ceramic electrolyte of symmetric polarization having a polished surface, said phosphoric acid having a concentration of $P_2O_5$ which polishes said ceramic body, said polishing having no significant deleterious effect on said ceramic electrolyte.

In a sodium-sulfur cell or battery, there are two kinds of resistances measured, a discharge resistance and a charge resistance. When the discharge resistance is significantly higher than the charge resistance, that is called asymmetric polarization. It is known that asymmetric polarization causes poor battery performance and short-life of the Na/S cell. As used herein, an electrolyte of asymmetric polarization is one which shows or will show asymmetric polarization when used as an electrolyte in a sodium-sulfur cell or battery, or an equivalent cell or battery. Also, as used herein, an electrolyte of symmetric polarization is one which shows or will show symmetric polarization, i.e. discharge resistance equal to or not significantly different from charge resistance, when used as an electrolyte in a sodium-sulfur cell or battery or an equivalent cell or battery.

The product of this third embodiment is a cationically-conductive ceramic electrolyte having a polished surface, said ceramic electrolyte being of symmetric polarization, said ceramic electrolyte ranging in composition from an alkali metal beta''-alumina phase to a mixture of alkali metal beta''-alumina phase and up to about 50% by volume of alkali metal beta-alumina phase based on the total volume of said electrolyte, said alkali metal being selected from the group consisting of sodium, potassium, lithium, mixtures thereof and alloys thereof.

The ceramic body or the cationically-conductive polycrystalline ceramic body to be polished in the present process is composed of alkali metal beta-alumina phase, or alkali metal beta''-alumina phase, or any combination of the alkali metal beta-alumina and alkali metal beta''-alumina phases. The present ceramic body covers a wide range of non-stoichiometric as well as stoichiometric compounds of alkali metal oxide and alumina and can be represented by the formula $A_2O \cdot xAl_2O_3$ where A is the alkali metal and x can vary from about 5 to about 11. The alkali metal is selected from the group consisting of sodium, potassium, lithium, mixtures thereof, and alloys thereof. The composition of the present ceramic body can be determined by a number of techniques such as, for example, X-ray diffraction analysis and X-ray fluorescence analysis.

When required, the present cationically-conductive polycrystalline ceramic body contains a stabilizer for the beta''-alumina phase. This stabilizer is selected from the group consisting of $Li_2O$, MgO, CoO and mixtures thereof. It is used in at least a stabilizing amount and usually ranges up to about 5% by weight of the ceramic body.

The alkali metal beta-alumina phase herein denotes that crystal structure in which the unit cell contains two spinel-like blocks, each with four layers of oxygen atoms, counting along the c-direction, with aluminum atoms in certain interstitial positions. The unit cell has a crystallographic repeat distance along the c-axis of approximately 22 Å. Monovalent cations are mobile in the rather loosely packed planes separating the individual spinel blocks. On the other hand, the alkali metal beta''-alumina phase denotes herein that the unit cell contains three spinel-like blocks and the crystallographic repeat distance is about 33 Å along the c-axis. In the alkali metal beta-alumina phase each spinel-like block is rotated 180° with respect to an adjacent one while in the alkali metal beta''-alumina phase, the rotation is 120°. In other words, the loosely packed conducting plane is also a mirror plane in the alkali metal beta-alumina phase but not in the alkali metal beta''-alumina phase.

The polycrystalline ceramic body to be polished can be prepared by a number of techniques. For example, a green body can be shaped in a conventional manner from the alkali metal beta-alumina powder or a mixture of reactants, for example, a mixture of sodium oxide, lithium oxide, magnesium oxide, and alumina, which will produce the present alkali metal beta-and/or alkali metal beta''-alumina. The green body can be produced in a conventional manner such as isostatic pressing or slip casting. It can be in any desired shape and size, and it can be, for example, of a geometrically complex and/or hollow form. Preferably, it is in the form of a hollow tube closed at one end which, when fired, will be suitable for use in a sodium-sulfur battery. Such a hollow tube can be prepared by a conventional ceramic processing technique or by electrophoretic deposition as disclosed in U.S. Pat. No. 3,900,381 to R. W. Powers, incorporated herein by reference and assigned to the assignee hereof. The green body or hollow tube preferably has a density of at least about 40%, and preferably at least 50% of the theoretical density for beta $Al_2O_3$, i.e. 3.26 g/cc, to promote shrinkage to high density. The green body is sintered in an atmosphere which has no significant deleterious effect on it at sintering temperature which may range from about 1525° C. to about 1825° C. For use as an electrolyte in a sodium-sulfur cell or battery, the sintered ceramic body has a density greater than 98%, and preferably greater than 99%, of the theoretical density for beta-$Al_2O_3$, i.e. 3.26 g/cc.

Copending Ser. No. 180,600, entitled "Production of Beta-Alumina Ceramic Tubes" filed on Aug. 25, 1980, now U.S. Pat. No. 4,302,519, in the name of Robert W. Powers et al., incorporated herein by reference and assigned to the assignee hereof discloses the production of sintered sodium beta-, beta''-alumina cylindrical tubes of uniform shape suitable for use as an electrolyte in a sodium-sulfur battery which are useful in the present process.

The present phosphoric acid is comprised of water and $P_2O_5$, i.e. it is the reaction product of $P_2O_5$ and water, and it has a concentration of $P_2O_5$ which polishes the ceramic body. The polishing phosphoric acid is in the liquid state during polishing, i.e. it is a viscous liquid during polishing. The polishing phosphoric acid has a concentration of $P_2O_5$ of at least about 70% by weight of the total weight of the acid, and as a practical matter, its $P_2O_5$ concentration ranges up to about 80% by weight of the total weight of the acid. The specific $P_2O_5$ concentration of the acid is determinable by measuring its specific gravity. If desired, a polishing phosphoric acid of $P_2O_5$ concentration higher than 80% can be used but it offers no significant advantage. In the present polishing process, phosphoric acid having a concentration of $P_2O_5$ lower than about 70% by weight may etch, or etch as well as polish, the ceramic body rather than just polish it.

A phosphoric acid having a concentration of $H_3PO_4$ of about 85 weight percent is approximately equal to a phosphoric acid having a $P_2O_5$ concentration of about 60 weight %. Since commercially available phosphoric acid does not have the required concentration of $P_2O_5$, it can be boiled to attain the desired concentration. Alternatively, a highly concentrated phosphoric acid can be purchased and admixed with a less concentrated phosphoric acid. Specifically, phosphoric acid with a $P_2O_5$ concentration of about 60% by weight begins to boil at a temperature ranging from about 120° C. to about 160° C., depending on its specific concentration. Since the acid vaporizes and increases in concentration as its boils, its boiling point increases continuously.

The present polishing is carried out at a temperature ranging from about 250° C. to about 350° C., i.e. the present polishing phosphoric acid ranges in temperature from about 250° C. to about 350° C. (at atmospheric pressure). Polishing temperatures higher than about 350° C. provide no significant advantage whereas a polishing temperature below about 250° C. is likely to etch as well as polish the ceramic body. In carrying out the present polishing, acid concentration, contact time and temperature are interrelated factors with the rate of polishing increasing with increasing acid concentration and increasing temperature. For example, polishing at a temperature of 300° C. may be completed in about 15 minutes, whereas polishing at a temperature of 350° C. may be completed in about 6 minutes. The rate of removal of ceramic material by the polishing phosphoric acid generally determines the specific polishing temperature. Preferably, for better control of the polishing rate, the polishing phosphoric acid ranges in temperature from about 280° C. to about 330° C. To prevent thermal shock, the ceramic body should be preheated to a temperature substantially the same as that of the contacting polishing phosphoric acid and usually, the preheated ceramic is within ±25° C. of the temperature of the polishing phosphoric acid.

In the present process, the ceramic body is contacted with the phosphoric acid and its surface or surface portion is polished to produce a body having a polished surface. The present polishing removes the resistive film or material when it is present on the ceramic body to decrease the specific resistivity at its surface portion to a value which is the same as or at least not significantly different from its specific intrinsic resistivity. Also, the present polishing removes asymmetric polarization-causing phases or material when they are present on the ceramic body to produce a polished ceramic body of symmetric polarization. Also, the present polishing removes microcracks and other flaws from the surface of the ceramic body thereby eliminating sources of mechanical and/or electromechanical failure. The extent of the present polishing is determinable empirically, and usually, it is completed by the polishing away, i.e. removal, of about 3 microns to about 10 microns of the surface of the ceramic body.

The ceramic body can be contacted with the phosphoric acid by a number of techniques and polished in a batch-wise or continuous manner, as desired. Preferably, the ceramic body is immersed in the phosphoric acid. When the acid contact period is completed, i.e. when the desired polishing has been attained, the phosphoric acid is removed from the polished body to arrest the acid attack, and preferably, such removal is carried out by rinsing the polished ceramic body with an alcohol such as methanol. The present polishing is carried out so that it has no significant deleterious effect on the resulting polished body.

The present polycrystalline ceramic body has a surface which is chemically polished. Since this surface is chemically polished, it does not show surface damage, i.e. surface damage which would be imparted by mechanical polishing. For example, examination of a ceramic body which had been mechanically polished by means of transmission electron microscopy would show scratches and defects like dislocations in the surface region or region immediately below the surface region which would not be shown by the present chemically polished ceramic body. In addition, mechanical polishing would likely change the structure of the surface of the ceramic electrolyte which would cause poor performance in a sodium-sulfur cell. Also, mechanical polishing is limited to simple shapes and could never be used for polishing, for example, the surface within a tube.

The present polished ceramic body is useful for a wide variety of applications. It is useful as an electrolyte in devices such as sodium-sulfur batteries and electrochromic displays. It is particularly useful as an electrolyte, usually in the form of a hollow tube closed at one end, in a sodium-sulfur cell or battery. Ordinarily, when used as an electrolyte, it has a density higher than about 98%, and preferably higher than about 99%, of the theoretical density for beta-alumina, i.e. 3.26 g/cc.

This invention is further illustrated by the following examples wherein the procedure and materials were as follows unless otherwise noted:

EXAMPLE 1

A sintered polycrystalline ceramic hollow tube closed at one end and open at the opposite end with an inner diameter of about 1.0 cm, a wall thickness of about 0.1 cm and a length of about 7 cm was used as an electrolyte. Almost 100% by volume of the sintered tube was sodium beta-alumina phase. The chemical composition of the sintered tube was 9.6% by weight $Na_2O$, 0.25% by weight $Li_2O$ and the balance was $Al_2O_3$. The tube had a density greater than about 99% of the theoretical density for beta-alumina and had been prepared in a known manner, i.e., the powder composition of 9.6% by weight $Na_2O$, 0.25% by weight $Li_2O$, balance alumina was formed into the shape of a green tube and fired at about 1575° C. in an atmosphere which had no significant deleterious effect on it. The microstructure of the surface of this as-sintered tube is shown in FIG. 1.

85% concentrated ($P_2O_5$ concentration of about 60% by weight) phosphoric acid was heated to a polishing temperature of 350° C. to increase its $P_2O_5$ concentration sufficiently for polishing. The acid started boiling at about 120° C., and with increasing temperature, its viscosity increased. When the polishing temperature of 350° C. was attained (after about 20 minutes heating time), it was known from previous experiments that the acid at this point had a concentration of $P_2O_5$ higher than about 70% by weight, i.e., $P_2O_5$ concentration was between about 70% and 75% by weight of the total weight of the acid.

The ceramic tube, which had been preheated to about 350° C. to prevent thermal shock, was immersed in the phosphoric acid which was maintained at 350° C. After about a 5-minute immersion in the acid, the tube was removed, cooled to room temperature and washed in methanol for 60 minutes to remove the excess phosphoric acid from its surface.

The entire surface of the ceramic tube appeared polished, i.e., the surface within the tube as well as its outer surface was glossy and smooth. FIG. 2 shows the microstructure of the polished surface.

The tube appeared not to have been changed significantly in size by the polishing and the polishing appeared not to have had any deleterious effect on it.

It was believed that the five-minute immersion in the polishing phosphoric acid had polished the tube sufficiently to remove the resistive surface film from its surface as well as the grain boundary areas near the surface. To test this, the polished tube was assembled in a half-cell in a usual manner, and the polished ceramic tube was electrolytically filled with liquid sodium from an $NaNO_3$ bath at 350° C. The radial resistance of the half-cell was measured utilizing an $NaNO_3$ bath on the outside surface of the polished ceramic tube and liquid sodium on its inside surface. The following results were obtained:

| Tube No. | Temperature(°C.) | Radial Resistance($\Omega$) | |
| --- | --- | --- | --- |
| | | Charge($R_c$) | Discharge($R_d$) |
| GW4-3 | 350 | 0.13 | 0.13 |

The cell-resistance value of 0.13 ohm was significantly lower than the value of 0.17 ohm which normally had been observed for similar tubes without this chemical polishing treatment, i.e., for as-sintered tubes of the same size which did not differ significantly in composition or density from the polished ceramic tube herein. This is ≈24% decrease in the half-cell resistance, which corresponds to the bulk resistivity value of ≈14$\Omega$-cm at 350° C. for this sintered ceramic composition. This value is very close to the bulk resistivity value of ≈13$\Omega$-cm at 350° C. for this sintered ceramic composition measured by the 4-probe technique.

This example illustrates the achievement of bulk resistivity for the ceramic tube in the radial direction in accordance with the present invention, i.e. the lowering of the specific resistivity at its surface portion so that it does not differ significantly from its specific intrinsic resistivity.

EXAMPLE 2

The procedure used in this example was substantially similar to that disclosed in Example 1 except that the sintered ceramic tube used as an electrolyte was different in composition and consisted essentially of sodium beta''-alumina phase.

85% concentrated (about 60% by weight $P_2O_5$) phosphoric acid was boiled for approximately 15 to 30 minutes so that its boiling point was increased. This occurs because of the loss of water from the acid causing it to become quite viscous. After such heating and at a polishing temperature of about 330° C., it was known from other experiments that the concentration of $P_2O_5$ therein was at least 70% by weight of the total weight of the acid.

The ceramic tube, which also had been preheated to about 330° C. to prevent thermal shock, was immersed in the phosphoric acid at 330° C. for about 5–10 minutes. From data obtained in other experiments, it was estimated that the $P_2O_5$ concentration of the acid increased to about 75% by weight.

The ceramic tube was then removed from the phosphoric acid, cooled to room temperature and washed for 60 minutes with methanol to remove phosphoric acid therefrom. The entire surface of the resulting tube was polished to a shiny smooth finish.

This example illustrates that the present ceramic composition can be economically chemically polished to produce a flawless surface that may lead to long life in a sodium/sulfur cell.

A sintered electrolyte tube composed of 100% by volume of sodium beta''-alumina phase having a density greater than 99% of theoretical density for beta-alumina generally show asymmetric polarization behavior (i.e. discharge resistance>charge resistance) in a Na/S cell or battery. To demonstrate that polishing treatment resulted into a ceramic electrolyte of symmetric polarization, i.e. charge resistance which is insignificantly different from the discharge resistance, a half-cell was assembled in a usual manner, and the half-cell was electrolytically filled with liquid sodium from an $NaNO_3$ bath at 350° C. The radial resistance of the half-cell was measured utilizing an $NaNO_3$ bath on the outside surface of the polished ceramic tube and liquid sodium on its inside surface. The following results were obtained:

| Tube No. | Temperature(°C.) | Radial Resistance($\Omega$) Charge($R_c$) | Discharge($R_d$) |
| --- | --- | --- | --- |
| 1.4–14-B-7 | 350 | 0.047 | 0.048 |

Since $R_c \simeq R_d$ the ceramic electrolyte showed symmetric resistance behavior in the polished state. Therefore, the polishing process also eliminates the surface film which normally leads as asymmetric polarization behavior.

EXAMPLE 3

A sintered polycrystalline ceramic tube substantially the same as the tube disclosed in Example 2 was used in this example.

85% concentrated (about 60% by weight $P_2O_5$) was heated to a temperature of about 120° C., and the ceramic, which was preheated to about 120° C., was immersed in the phosphoric acid which was maintained at 120° C. After being immersed in the acid for about 2–5 minutes, the ceramic finally was removed, cooled to room temperature and washed with methanol for one hour.

The entire surface of the ceramic tube was etched. Specifically, this treatment resulted in the removal of surface layer but via etching mechanism, i.e., there was preferential attack of the acid at the grain boundaries. Therefore, normal phosphoric acid (about 60% by weight $P_2O_5$) results in etching of the present compositions.

EXAMPLE 4

A sintered piece of zirconia was immersed in phosphoric acid under the polishing conditions disclosed in Example 1. The acid had no polishing effect on the zirconia.

EXAMPLE 5

Sintered polycrystalline alpha-alumina was immersed in phosphoric acid under the polishing conditions disclosed in Example 1. The acid had no polishing effect on the alpha-alumina.

The following copending U.S. patent applications are assigned to the assignee hereof and are incorporated herein by reference:

Ser. No. 289,580 filed on even date herewith in the name of Raj Narain Singh entitled "ETCHED BETA''-ALUMINA CERAMIC ELECTROLYTE" discloses a cationically-conductive sodium beta''-alumina electrolyte showing asymmetric polarization which is contacted with phosphoric acid to produce an etched electrolyte showing no asymmetric polarization.

Ser. No. 289,579 filed on even data herewith in the name of Raj Narain Singh entitled "ETCHED CATIONICALLY-CONDUCTIVE CERAMIC BODY" discloses a cationically-conductive polycrystalline body having a specific resistivity at its surface portion higher than its specific intrinsic resistivity which is contacted with phosphoric acid to produce an etched body having a uniform specific intrinsic resistivity.

What is claimed is:

1. A process for producing a polished ceramic body which comprises providing a polycrystalline ceramic body, said ceramic body ranging in composition from an alkali metal beta-alumina phase to an alkali metal beta''-alumina phase including all combinations of said alkali metal beta-alumina phase and said alkali metal beta''-alumina phase, said alkali metal being selected from the group consisting of sodium, potassium. lithium, mixtures thereof, and alloys thereof, and polishing said ceramic body by contacting it with phosphoric acid at a temperature ranging from about 250° C. to about 350° C. to produce a ceramic body with a polished surface, said phosphoric acid having a concentration of $P_2O_5$ which polishes said ceramic body, said polishing having no significant deleterious effect on said ceramic body.

2. The process according to claim 1 wherein said alkali metal is sodium.

3. The process according to claim 1 wherein said ceramic body contains alkali metal beta''-alumina phase and a stabilizer for said alkali metal beta''-alumina phase in a stabilizing amount.

4. The process according to claim 3 wherein said stabilizer is selected from the group consisting of $Li_2O$, MgO, NiO, CoO and mixtures thereof.

5. A process for producing a cationically-conductive ceramic body having a polished surface and a specific resistivity at its polished surface portion which is at least not significantly different from its specific intrinsic resistivity which comprises providing a cationically-conductive ceramic body having a specific resistivity at its surface portion significantly higher than its specific intrinsic resistivity, said ceramic body ranging in composition from an alkali metal beta-alumina phase to an alkali metal beta''-alumina phase including all combinations of said alkali metal beta-alumina phase and said alkali metal beta''-alumina phase, said alkali metal being selected from the group consisting of sodium, potassium, lithium, mixtures thereof and alloys thereof, and polishing said ceramic body by contacting it with phosphoric acid at a temperature ranging from about 250° C. to about 350° C. to produce said cationically-conductive body with a polished surface, said phosphoric acid having a concentration of $P_2O_5$ which polishes said ceramic body, said polishing having no significant deleterious effect on said ceramic body.

6. The process according to claim 5 wherein said alkali metal is sodium.

7. The process according to claim 5 wherein said ceramic body contains alkali metal beta''-alumina phase and a stabilizer for said alkali metal beta''-alumina phase in a stabilizing amount.

8. The process according to claim 7 wherein said stabilizer is selected from the group consisting of $Li_2O$, MgO, NiO, CoO and mixtures thereof.

9. A process for producing a cationically-conductive ceramic electrolyte of symmetric polarization which comprises providing a cationically-conductive ceramic electrolyte of asymmetric polarization, said electrolyte ranging in composition from an alkali metal beta''-alumina phase to a mixture of alkali metal beta''-alumina phase and up to about 50% by volume of alkali metal beta''-alumina phase based on the total volume of the electrolyte, said alkali metal being selected from the group consisting of sodium, potassium, lithium, mixtures thereof and alloys thereof, and polishing said ceramic electrolyte by contacting it with phosphoric acid at a temperature ranging from about 250° C. to about 350° C. to produce said cationically-conductive ceramic electrolyte of symmetric polarization having a polished surface, said phosphoric acid having a concentration of $P_2O_5$ which polishes said ceramic body, said polishing having no significant deleterious effect on said ceramic electrolyte.

10. The process according to claim 9 wherein said alkali metal is sodium.

11. The process according to claim 9 wherein said ceramic body contains a stabilizer for said alkali metal beta''-alumina phase in a stabilizing amount.

12. The process according to claim 11 wherein said stabilizer is selected from the group consisting of $Li_2O$, MgO, NiO, CoO and mixtures thereof.

* * * * *